United States Patent
Kassai et al.

(10) Patent No.: US 10,408,185 B2
(45) Date of Patent: Sep. 10, 2019

(54) CONTROL METHOD AND CONTROL DEVICE FOR INTERNAL COMBUSTION ENGINE

(71) Applicant: NISSAN MOTOR CO., LTD., Yokohama-shi, Kanagawa (JP)

(72) Inventors: Masaharu Kassai, Kanagawa (JP); Hiroki Hashimoto, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 16/073,387

(22) PCT Filed: Feb. 5, 2016

(86) PCT No.: PCT/JP2016/053530
§ 371 (c)(1),
(2) Date: Jul. 27, 2018

(87) PCT Pub. No.: WO2017/134822
PCT Pub. Date: Aug. 10, 2017

(65) Prior Publication Data
US 2019/0032622 A1    Jan. 31, 2019

(51) Int. Cl.
*F02P 5/04* (2006.01)
*F02D 41/34* (2006.01)
(Continued)

(52) U.S. Cl.
CPC .............. *F02P 5/045* (2013.01); *F02D 15/02* (2013.01); *F02D 15/04* (2013.01); *F02D 23/02* (2013.01);
(Continued)

(58) Field of Classification Search
CPC ...... F02P 5/04; F02P 5/042; F02P 5/15; F02D 15/02; F02D 15/04; F02D 41/00;
(Continued)

(56) References Cited

U.S. PATENT DOCUMENTS 6,505,601 B1    1/2003  Jorach et al.
7,204,228 B2 *  4/2007  Oechsle .............. F02D 41/3023
                                                      123/295
(Continued)

FOREIGN PATENT DOCUMENTS

DE          199 53 932 A1    5/2001
DE     10 2005 044 544 A1    3/2007
(Continued)

*Primary Examiner* — John Kwon
*Assistant Examiner* — Johnny H Hoang
(74) *Attorney, Agent, or Firm* — Drinker Biddle & Reath LLP (57) ABSTRACT

A control method for internal combustion engine includes forming an air-fuel mixture leaner than that at a stoichiometric air-fuel ratio in a cylinder by first fuel injection, performing second fuel injection to inject fuel toward the vicinity of a discharge channel of an ignition plug during a period in which the air-fuel mixture is undergoing a low temperature oxidation reaction in a compression stroke, and after the second fuel injection, performing spark ignition by the ignition plug at a timing at which a spark of the ignition plug reaches the fuel injected by the second fuel injection.

4 Claims, 8 Drawing Sheets

(51) Int. Cl.
*F02D 43/00* (2006.01)
*F02P 5/15* (2006.01)
*F02D 15/02* (2006.01)
*F02D 15/04* (2006.01)
*F02D 23/02* (2006.01)
*F02D 41/30* (2006.01)
*F02D 41/40* (2006.01)
*F02D 41/00* (2006.01)
*F02D 43/04* (2006.01)
*F02B 1/12* (2006.01)
*F02D 41/38* (2006.01)

(52) U.S. Cl.
CPC ..... *F02D 41/0007* (2013.01); *F02D 41/3035* (2013.01); *F02D 41/3041* (2013.01); *F02D 41/34* (2013.01); *F02D 41/402* (2013.01); *F02D 43/00* (2013.01); *F02D 43/04* (2013.01); *F02P 5/15* (2013.01); *F02B 1/12* (2013.01); *F02D 2041/389* (2013.01); *Y02T 10/144* (2013.01); *Y02T 10/46* (2013.01)

(58) Field of Classification Search
CPC .... F02D 41/0007; F02D 41/402; F02D 41/30; F02D 41/40; F02D 41/3035; F02D 41/3041; F02D 23/02; F02D 43/04
USPC .............. 123/295–300, 305, 406.11, 406.26, 123/406.47
See application file for complete search history.

(56) References Cited

U.S. PATENT DOCUMENTS

| | | | |
|---|---|---|---|
| 7,370,629 B2 * | 5/2008 | Kohler | F02B 23/101 123/295 |
| 2002/0050265 A1 * | 5/2002 | Yoshida | F02D 37/02 123/295 |
| 2003/0015168 A1 * | 1/2003 | Yoshida | F02D 37/02 123/295 |
| 2006/0005804 A1 * | 1/2006 | Kuo | F02M 26/01 123/295 |
| 2006/0196469 A1 * | 9/2006 | Kuo | F02D 9/02 123/305 |
| 2007/0023003 A1 | 2/2007 | Oechsle et al. | |
| 2007/0227503 A1 | 10/2007 | Hitomi et al. | |
| 2012/0253640 A1 | 10/2012 | Nada | |
| 2015/0114342 A1 | 4/2015 | Iwai et al. | |
| 2015/0240706 A1 | 8/2015 | Yamagata et al. | |
| 2017/0241359 A1 * | 8/2017 | Hosoya | B01D 53/9445 |

FOREIGN PATENT DOCUMENTS

| | | |
|---|---|---|
| JP | 2004-27959 A | 1/2004 |
| JP | 2007-292050 A | 11/2007 |
| JP | 2010-196517 A | 9/2010 |
| JP | 2013-96287 A | 5/2013 |
| JP | 2014-163251 A | 9/2014 |
| WO | WO 2005/100768 A1 | 10/2005 |

* cited by examiner

CONTROL METHOD AND CONTROL DEVICE FOR INTERNAL COMBUSTION ENGINE

TECHNICAL FIELD

The present invention relates to a control of a spark ignition internal combustion engine.

BACKGROUND ART

In recent years, low fuel consumption of vehicles has been desired in terms of environmental problems and the like. Thus, it has been and is being studied to operate an internal combustion engine using gasoline as fuel (hereinafter, also referred to as a "gasoline engine") at an air-fuel ratio leaner than a stoichiometric air-fuel ratio, i.e. in a state where an excess air ratio $\lambda$ is larger than 1 (hereinafter, also referred to as "lean combustion"). For example, JP2010-196517A discloses a technique for diffusive self-ignition combustion of gasoline by forming a high temperature field in a cylinder (combustion chamber) by pre-combustion and injecting the gasoline to pass through the high temperature field. According to this technique, diffusive self-ignition combustion similar to that of a diesel engine is possible also in a gasoline engine, wherefore fuel consumption performance can be improved by performing lean combustion.

SUMMARY OF INVENTION

However, a limit value of the excess air ratio $\lambda$ on a lean side (hereinafter, also referred to as a "lean limit") at which stable combustion is possible in a gasoline engine is conventionally said to be about 2, which is the same also in the technique of the above literature.

Accordingly, the present invention aims to perform stable combustion at an excess air ratio leaner than that conventionally regarded as a lean limit in gasoline engines.

According to one embodiment of the present invention, a control method for internal combustion engine comprising: forming an air-fuel mixture leaner than that at a stoichiometric air-fuel ratio in a cylinder by first fuel injection; performing second fuel injection to inject fuel toward the vicinity of a discharge channel of an ignition plug during a period in which the air-fuel mixture is undergoing a low temperature oxidation reaction in a compression stroke; and after the second fuel injection, performing spark ignition by the ignition plug at a timing at which a spark of the ignition plug reaches the fuel injected by the second fuel injection.

DESCRIPTION OF EMBODIMENT

Hereinafter, an embodiment of the present invention is described with reference to the drawings and the like.

Figure 1:
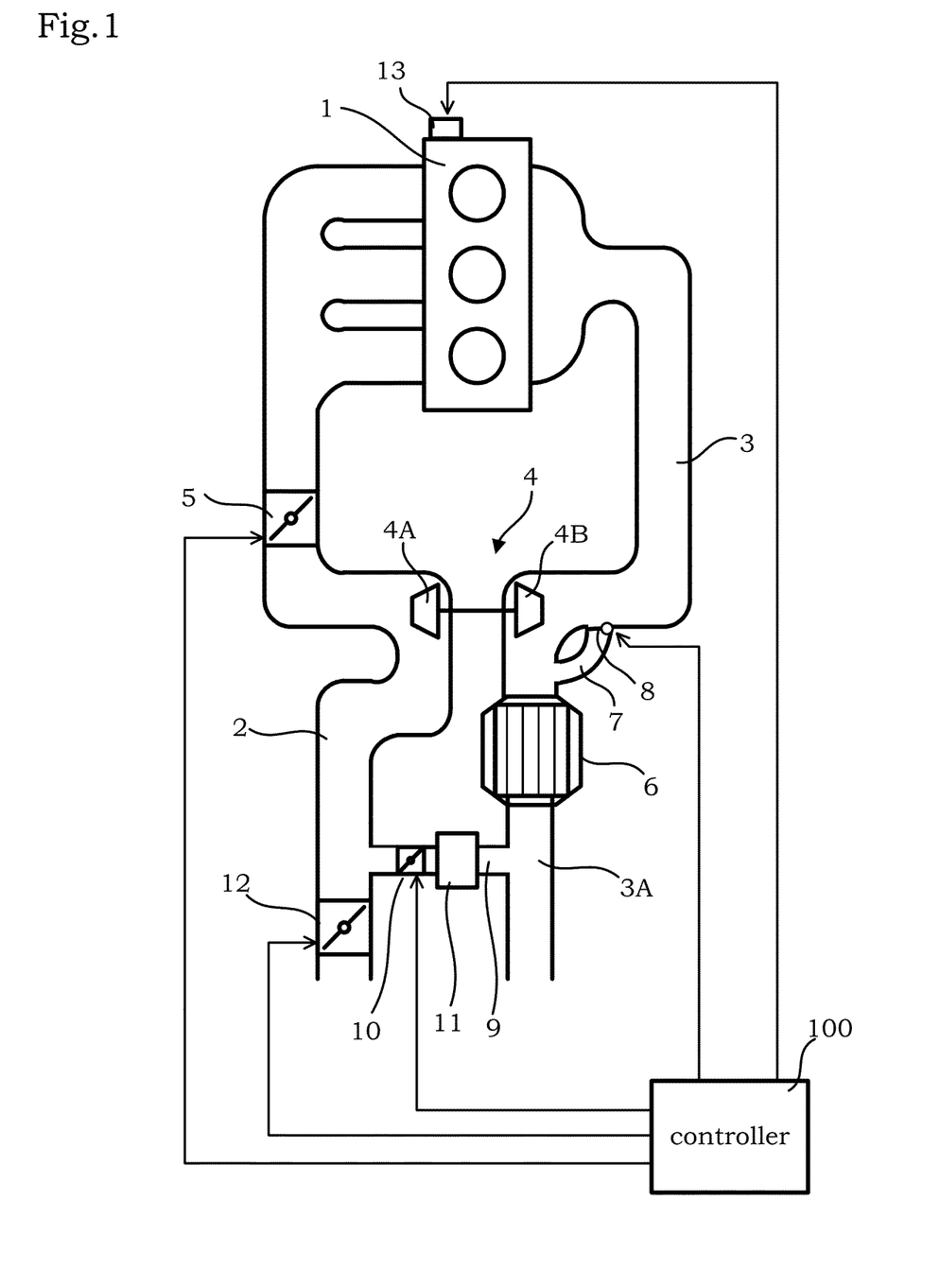
FIG. 1 is a schematic configuration diagram of a system to which an embodiment is applied.

FIG. 1 is a schematic configuration diagram of a system to which the embodiment is applied.

A differential pressure generation valve 12, a compressor 4A of a turbo supercharger 4 and a throttle valve 5 for adjusting an engine load are arranged in this order from an upstream side along the flow of intake air in an intake passage 2 of an internal combustion engine 1. The differential pressure generation valve 12 and the throttle valve 5 are valves, which are each drivingly opened and closed by an electric motor and controlled by a controller 100 to be described later. Although butterfly valves are shown as the differential pressure generation valve 12 and the throttle valve 5 in FIG. 1, valves of another type may be used.

A turbine 4B of the turbo supercharger 4 and an exhaust gas purifying catalyst 6 are arranged in this order from an upstream side along the flow of exhaust gas in an exhaust passage 3 of the internal combustion engine 1. The exhaust gas purifying catalyst 6 is, for example, a three-way catalyst.

The internal combustion engine 1 includes a bypass passage 7 allowing communication between sides upstream of and downstream of the turbine 4B in the exhaust passage 3. A waste gate valve 8 for opening and closing the bypass passage 7 is arranged in the bypass passage 7. The waste gate valve 8 is a valve which is drivingly opened and closed by an electric motor and controlled by the controller 100 to be described later. When the waste gate valve 8 is opened, part of exhaust gas flows while detouring the turbine 4B. Thus, a supercharging pressure can be adjusted by controlling an opening degree of the waste gate valve 8. That is, in an operation region where the supercharging pressure is above an atmospheric pressure and an intake air amount cannot be controlled by the throttle valve 5, an engine load is controlled by the waste gate valve 8.

It should be noted that although a swing valve is shown as the waste gate valve 8 in FIG. 1, a valve of another type may be used.

Further, this system includes an EGR device for recirculating part of the exhaust gas to the intake passage 2. Hereinafter, exhaust gas to be recirculated is referred to as EGR gas.

The EGR device includes an EGR passage 9 communicating an exhaust passage 3A downstream of the exhaust gas purifying catalyst 6 with an intake passage 2 upstream of the compressor 4A, an EGR valve 10 for opening and closing the EGR passage 9 and an EGR cooler 11 for cooling the exhaust gas passing along the EGR passage 9.

The internal combustion engine 1 includes a variable valve mechanism 13 for changing valve timings of an intake valve and an exhaust valve. A known mechanism may be applied as the variable valve mechanism 13. For example, a mechanism for changing a rotational phase of an intake cam shaft with respect to a crankshaft is used.

The controller 100 sets a fuel injection amount, a fuel injection timing, an ignition timing, an EGR rate and the like on the basis of detection values of unillustrated crank angle sensor, accelerator position sensor, intake air pressure sensor, air flow meter and the like. Then, the controller 100 controls the opening and closing of the differential pressure generation valve 12, the throttle valve 5, the EGR valve 10 and the waste gate valve 8 and controls the valve timing using the variable valve mechanism 13 on the basis of these set values.

It should be noted that the controller 100 is constituted by a microcomputer including a central processing unit (CPU), a read-only memory (ROM), a random access memory (RAM) and an input/output interface (I/O interface). It is also possible to constitute the controller 100 by a plurality of microcomputers.

Figure 2:
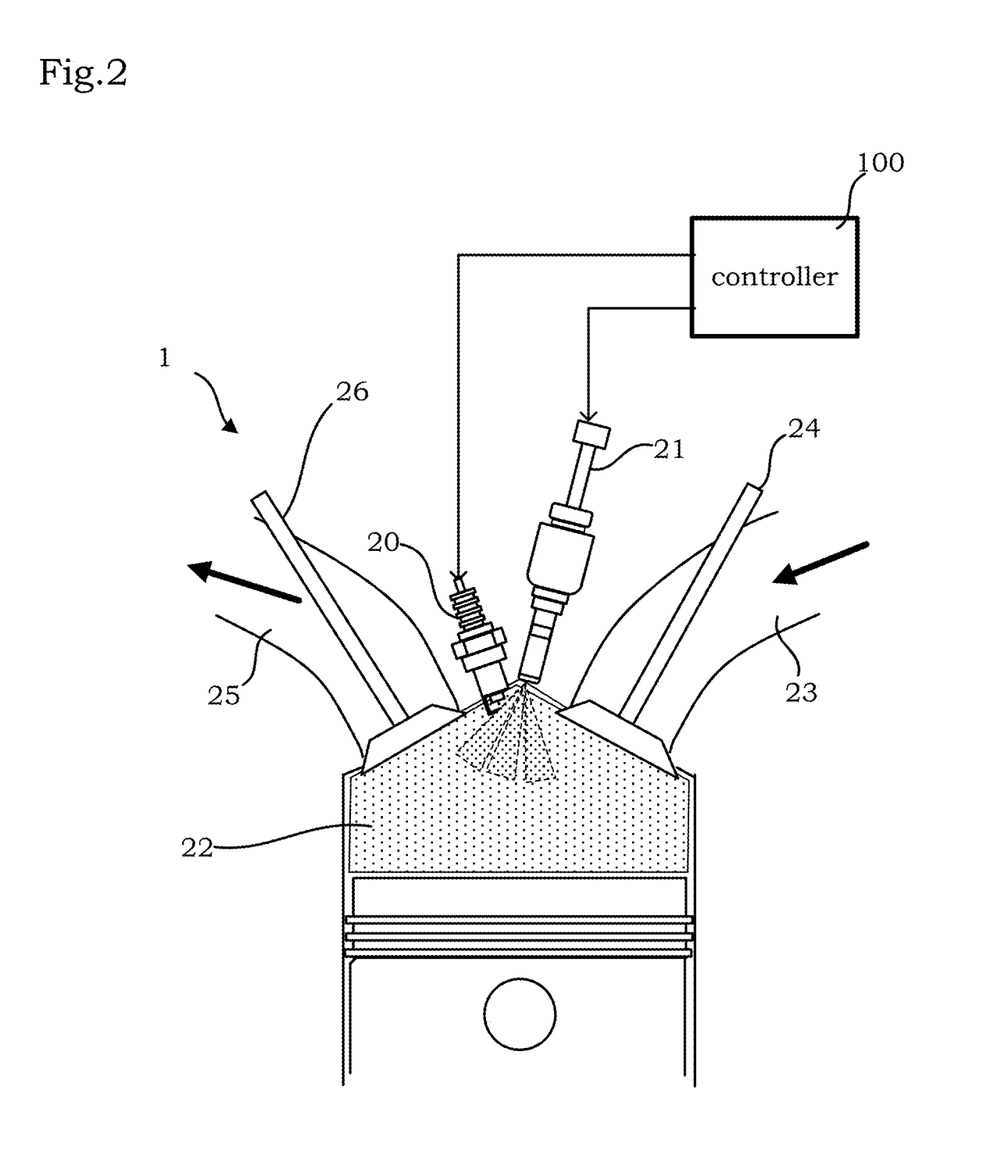
FIG. 2 is a sectional view of an internal combustion engine.

FIG. 2 is a sectional view of one cylinder of the internal combustion engine 1.

The intake passage 23 and the exhaust passage 25 communicate with a combustion chamber 22. An intake valve 24 is provided at an opening of the intake passage 23 on the combustion chamber side. An exhaust valve 26 is provided at an opening of the exhaust passage 25 on the combustion chamber side.

An ignition plug 20 and a fuel injection valve 21 are arranged adjacent to each other on a ceiling surface of the combustion chamber 22. The fuel injection valve 21 is a multi-hole valve and a plurality of spray beams are formed as shown at the time of fuel injection. At least one of the plurality of spray beams passes through the vicinity of a discharge channel of the ignition plug 20. The "vicinity" mentioned here means a proximate range enough to ignite sprayed fuel when the ignition plug 20 is sparked.

Further, the internal combustion engine 1 includes a variable compression ratio mechanism capable of variably controlling a compression ratio. A mechanism for changing a top dead center position of a piston by coupling the crankshaft and the piston by a plurality of links can be, for example, used as the variable compression ratio mechanism. It should be noted that another known mechanism such as a mechanism for variably controlling the position of a cylinder head can also be used.

The internal combustion engine 1 configured as described above can perform lean combustion while performing supercharging by the turbo supercharger 4 in a predetermined operation region (e.g. low load region), i.e. a so-called supercharged lean operation.

Next, a fuel injection control and an ignition control during the supercharged lean operation are described.

Figure 3:
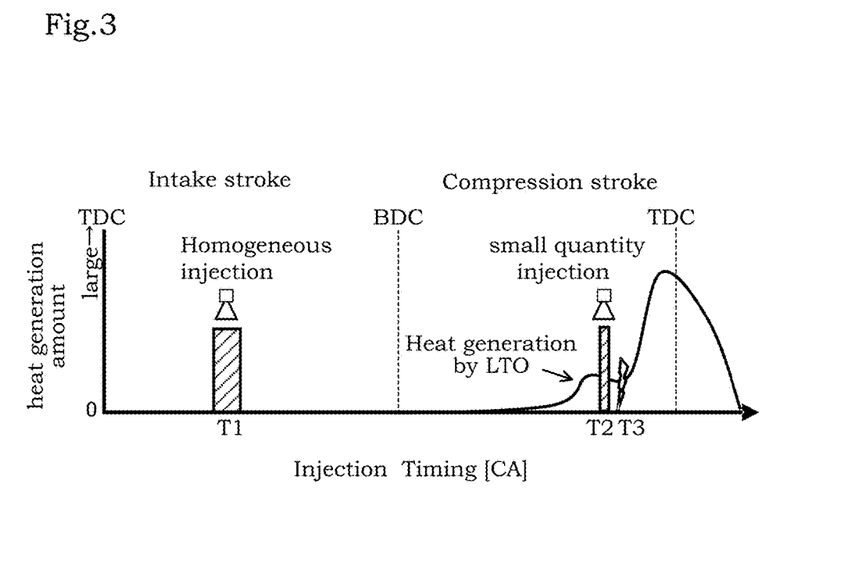
FIG. 3 is a timing chart in the case of carrying out the embodiment.

FIG. 3 is a timing chart showing a fuel injection timing, an ignition timing and a heat generation amount in the combustion chamber during the supercharged lean operation. The heat generation amount is zero when an intake stroke is finished.

The controller 100 forms a homogeneous air-fuel mixture in the combustion chamber by performing first fuel injection at timing T1 during the intake stroke. Here, supercharging is performed by the turbo supercharger 4 so that an air-fuel ratio (A/F) of the air-fuel mixture becomes about 30 to generate a required load at an excess air ratio $\lambda=2$. At this time, the controller 100 controls the variable compression ratio mechanism toward a high compression ratio side.

Conditions as described above including high supercharging, a high compression ratio and a high excess air ratio are arranged to cause a low temperature oxidation reaction of the homogeneous air-fuel mixture in a compression stroke. The low temperature oxidation reaction becomes more active with an increase in temperature. Accordingly, a situation is produced where a temperature easily increases during the compression stroke by setting a high compression ratio. Further, the low temperature oxidation reaction becomes more active with an increase in the density of the air-fuel mixture. Accordingly, a cylinder internal pressure is enhanced to enhance the density of the air-fuel mixture by supplying a large amount of air into the combustion chamber by the turbo supercharger 4.

Upon entry into the compression stroke with the above conditions satisfied, the air-fuel mixture in the combustion chamber is compressed by the piston to reach a high temperature and a high density, whereby the low temperature oxidation reaction occurs.

It should be noted that since a specific value of each condition differs depending on the specification of the internal combustion engine 1, this value is determined by matching.

If heat is generated due to the low temperature oxidation reaction during the compression stroke, the controller 100 performs second fuel injection to inject a smaller amount of fuel than in the first fuel injection at timing T2 during a period in which heat is generated.

It should be noted that about 90% of the amount of fuel to be injected in one cycle is injected by the first fuel injection and about remaining 10% of the fuel is injected by the second fuel injection. Further, a higher fuel injection pressure is desirable. This is because the sprayed fuel is more atomized with an increase in fuel injection pressure, with the result that the deterioration of exhaust gas components can be suppressed.

A timing of generating heat by the low temperature oxidation reaction is obtained by simulation or the like, and a timing of performing the second fuel injection is set on the basis of the obtained timing. It should be noted that a temperature change in the combustion chamber may be monitored and the second fuel injection may be started upon detection of heat generation by the low temperature oxidation reaction.

Then, the controller 100 performs spark ignition by the ignition plug 20 at timing T3 before the spray of the fuel injected by the second fuel injection completely passes through the discharge channel of the ignition plug 20. The timing T3 is, in other words, a timing at which a spark of the ignition plug reaches the fuel injected by the second fuel injection.

The heat generation amount when the above fuel injection and spark ignition are performed is as shown in FIG. 3. The heat generation amount gradually increases to a middle of the compression stroke because the air-fuel mixture was compressed by the piston. This heat generation occurs also in general internal combustion engines using no low temperature oxidation reaction. The heat generation amount suddenly increases immediately before timing T2 because the low temperature oxidation reaction started. The heat generation amount further increases after timing T3 because combustion by spark ignition started. As just described, in the control of the present embodiment utilizing the low temperature oxidation reaction, the heat generation amount increases in two stages.

By the above control, stable combustion is possible even at an excess air ratio λ=2 or higher. This mechanism is inferred as follows.

Figure 4:
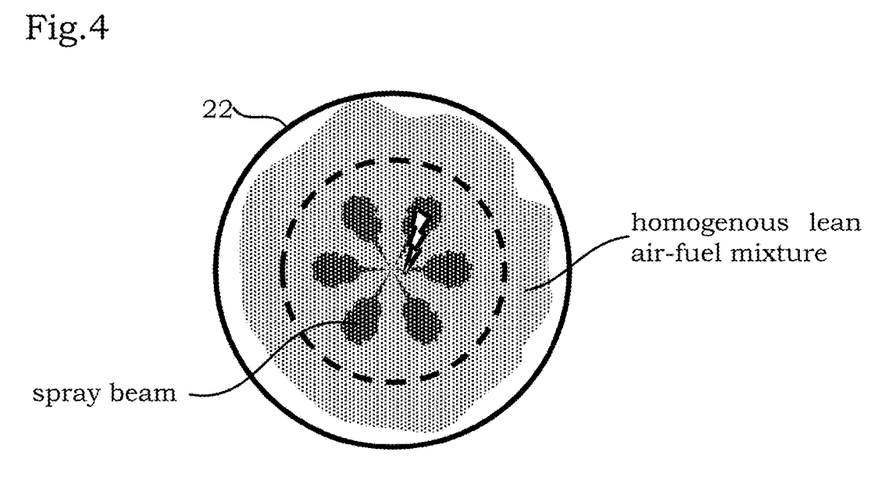
FIG. 4 is a diagram showing a state of a combustion chamber at a spark ignition timing.
Figure 5:
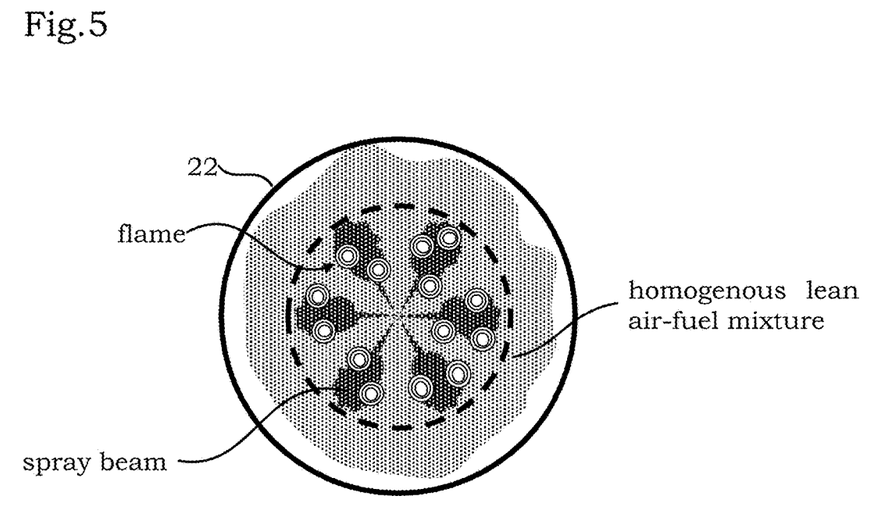
FIG. 5 is a diagram showing a state of the combustion chamber after spark ignition.

FIGS. 4 and 5 are both schematic diagrams showing the combustion chamber 22 viewed from an upper surface. FIG. 4 shows a state where spark ignition is performed. FIG. 5 shows a state after spark ignition. Circles in FIG. 5 indicate the occurrence of self-ignition.

As described above, the low temperature oxidation reaction occurs at the timing of performing the second fuel injection. The low temperature oxidation reaction is an oxidation reaction of fuel molecules in gasoline occurring in a temperature range of 600 [K] to 800 [K], and mainly occurs near a central part of the combustion chamber 22 (within a broken line of FIG. 4). That is, radicals are generated in the homogeneous air-fuel mixture leaner than that at a stoichiometric air-fuel ratio (hereinafter, also referred to as "homogenous lean air-fuel mixture") by the low temperature oxidation reaction. By performing the second fuel injection to the combustion chamber 22 in which the radicals are present, self-ignition of the gasoline is promoted.

Further, since a gas turbulence occurs in the combustion chamber 22 if the second fuel injection is performed, flame propagation after spark ignition is promoted. It should be noted that, in FIG. 5, the spray beams are free from a gas turbulence for simplicity.

According to the present embodiment, flames by spark ignition propagate while self-ignition occurs as described above. Thus, stable combustion is possible even at the lean air-fuel ratio providing an excess air ratio λ=2 or higher, which has been conventionally said to be a lean limit.

It is considered that the longer the reaction time of the low temperature oxidation reaction is, the larger the amount of radical generated becomes, and as a result, the combustion stability is enhanced. Specifically, the control of the present embodiment is thought to be more effective in a low revolution speed region of the internal combustion engine 1.

Although supercharging is performed so that the air-fuel ratio becomes about 30 in the above description, stable combustion is possible even at a leaner air-fuel ratio as described below.

Figure 6:
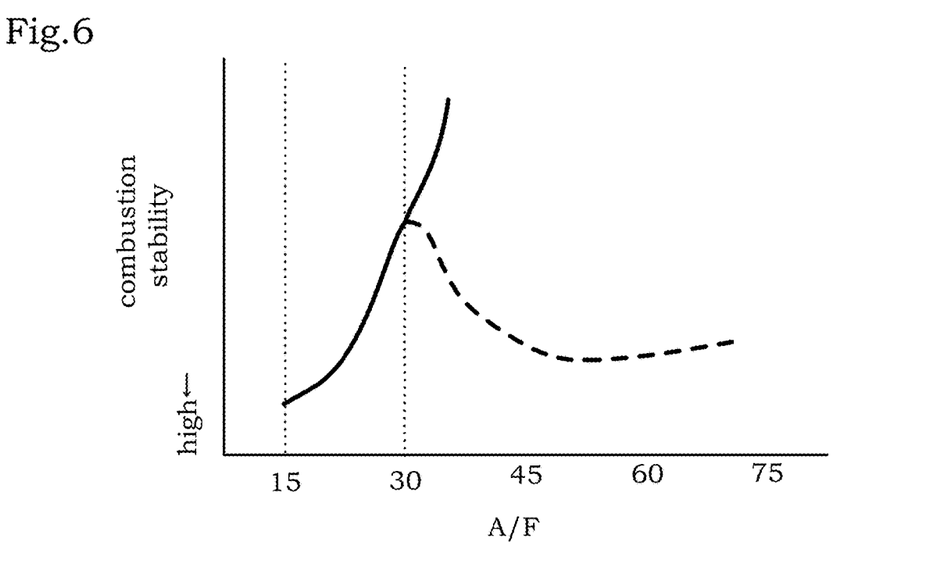
FIG. 6 is a graph showing a relationship between combustion stability and an air-fuel ratio.

FIG. 6 is a graph showing a relationship between combustion stability and the air-fuel ratio. A solid line of FIG. 6 represents combustion stability by a conventional control not utilizing the low temperature oxidation reaction. A broken line of FIG. 6 represents combustion stability by the present embodiment.

In the conventional control, an air-fuel ratio (A/F)=about 30 is a so-called lean limit in terms of a combustion stability limit. However, as shown, combustion stability can be kept up to an air-fuel ratio (A/F) of about 70 according to the present embodiment.

Figure 7:
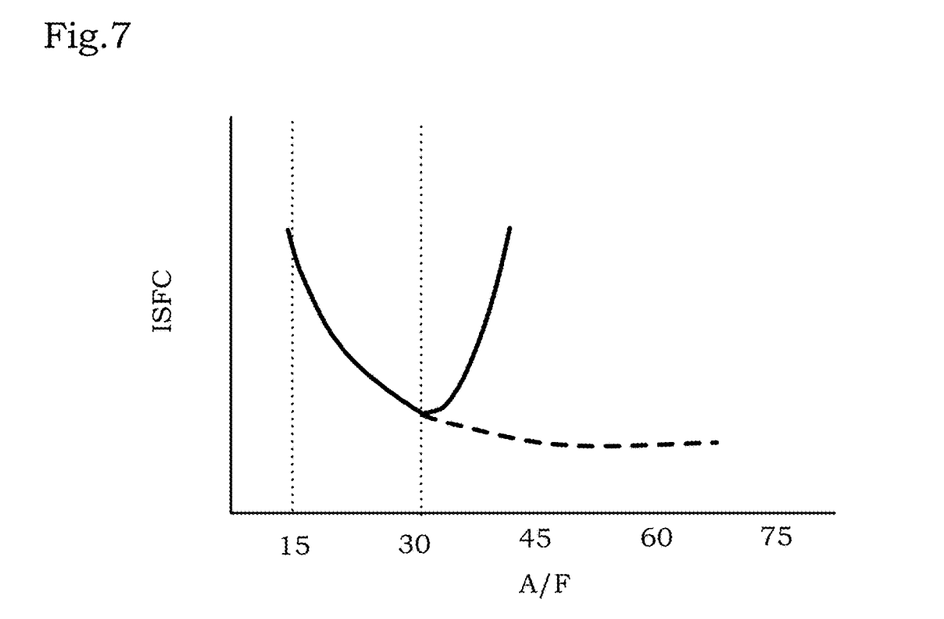
FIG. 7 is a graph showing a relationship between fuel consumption performance and the air-fuel ratio.

FIG. 7 is a graph showing a relationship between fuel consumption performance and the air-fuel ratio. A solid line of FIG. 7 represents fuel consumption performance by the conventional control not utilizing the low temperature oxidation reaction. A broken line of FIG. 7 represents fuel consumption performance by the present embodiment. It should be noted that the fuel consumption performance mentioned here is indicated specific fuel consumption (ISFC).

In the conventional control, if the air-fuel ratio (A/F) exceeds 30, the indicated specific fuel consumption increases due to a decrease in combustion stability. However, according to the present embodiment, combustion stability is kept even if the air-fuel ratio (A/F) exceeds 30 as described above. Thus, the indicated specific fuel consumption can be suppressed by making the air-fuel ratio leaner.

According to the present embodiment, it is possible not only to improve fuel consumption performance as described above, but also to suppress the deterioration of exhaust gas components as described below.

Figure 8:
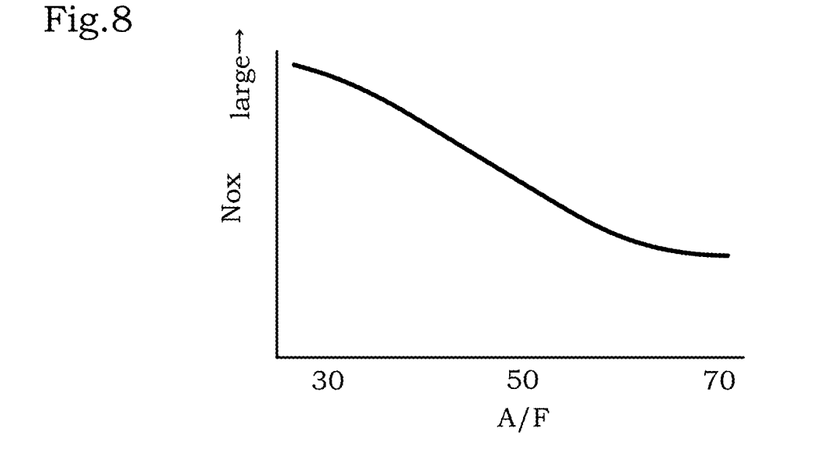
FIG. 8 is a graph showing a relationship between a NOx emission amount and the air-fuel ratio.

FIG. 8 is a graph showing a relationship between a NOx emission amount and the air-fuel ratio.

In the case of lean combustion, NOx cannot be purified by a three-way catalyst unlike in the case of combustion at the stoichiometric air-fuel ratio. Thus, the amount of NOx emitted from the internal combustion engine 1 (NOx emission amount) needs to be reduced. NOx are oxidized nitrogen in the combustion chamber and this oxidation reaction is more promoted with an increase in in-cylinder temperature. Further, in a configuration for forming an air-fuel mixture around an ignition plug by second fuel injection as in the present embodiment, injected fuel is burned without being diffused very much. Thus, if the air-fuel ratio is equal, the NOx emission amount increases as compared to a configuration for forming a homogenous lean air-fuel mixture in the combustion chamber. However, in the configuration for forming the air-fuel mixture around the ignition plug by the second fuel injection as in the present embodiment, the air-fuel ratio in the entire combustion chamber can be made leaner and the NOx emission amount decreases as shown if the air-fuel ratio becomes leaner. Thus, an increase of the NOx emission amount can be suppressed by making the air-fuel ratio of the entire combustion chamber leaner while ensuring combustion stability.

Figure 9:
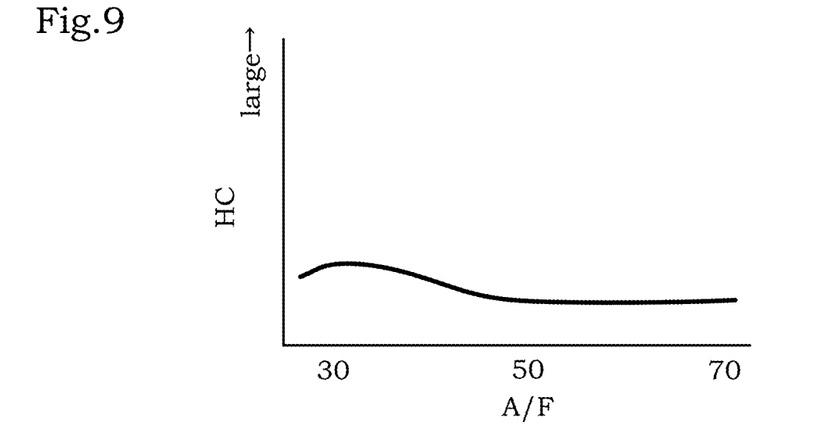
FIG. 9 is a graph showing a relationship between a HC emission amount and the air-fuel ratio.

FIG. 9 is a graph showing a relationship between a HC emission amount and the air-fuel ratio. HC is composed of unburned fuel and intermediate product by combustion and most thereof is generated in a boundary layer in a combustion chamber wall surface. According to a conventionally known control, the HC emission amount increases since HC cannot be bonded to oxygen if the air-fuel ratio is rich, and the HC emission amount increases due to flame-out near the wall surface caused by a combustion temperature reduction and combustion slow-down also when the air-fuel ratio is a certain lean air-fuel ratio or leaner. Since combustion can be activated by fuel injection also at the lean air-fuel ratio according to the present embodiment, the HC emission amount can be suppressed as compared to the conventionally known control as shown in FIG. 9.

Figure 10:
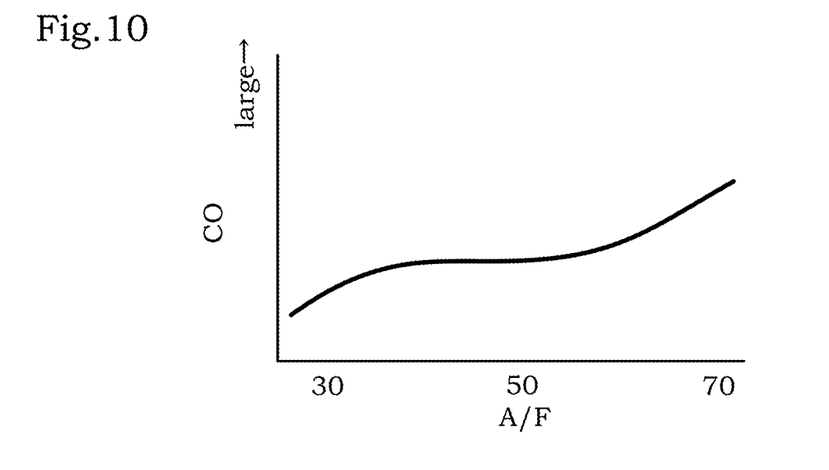
FIG. 10 is a graph showing a relationship between a CO emission amount and the air-fuel ratio.

FIG. 10 is a graph showing a relationship between a CO generation amount and the air-fuel ratio.

CO in the exhaust gas is generated by incomplete combustion of carbon (C) due to a shortage of oxygen. In the case of lean combustion, an emission amount is known to decrease since sufficient oxygen is present for the gasoline. However, in a region where the air-fuel ratio (A/F) is higher than 30, the emission amount gradually increases as shown in FIG. 10. This is because CO is oxidized to reduce a reaction speed to become $CO_2$ and a ratio of remaining to be CO increases since a combustion temperature decreases as the air-fuel ratio becomes leaner.

If the aforementioned combustion stability, fuel consumption performance and exhaust gas components are comprehensively considered, an air-fuel ratio (A/F) of about 45, i.e. an excess air ratio λ of about 3 is set as an upper limit in supercharged lean combustion of the present embodiment.

Next, a difference between generally known multi-stage injection and the present embodiment is described.

Figure 11:
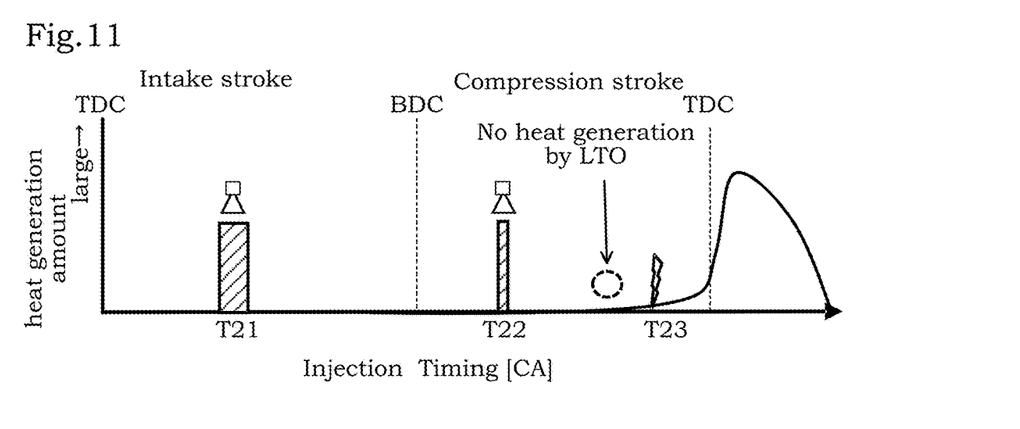
FIG. 11 is a timing chart in the case of an operation at an excess air ratio $\lambda=1$.

FIG. 11 is a timing chart showing a fuel injection timing, an ignition timing and a heat generation amount in the combustion chamber when the excess air ratio $\lambda=1$ as in FIG. 3.

At timing T21 during an intake stroke, fuel injection is performed to form a homogeneous air-fuel mixture in the combustion chamber. Here, since a required load is generated at the excess air ratio $\lambda=1$, the amount of air supplied to the combustion chamber 22 is about 14.7 when a fuel injection amount is 1. Thus, the inside of the combustion chamber does not reach a high temperature and a high density during a compression stroke unlike in the present embodiment, wherefore no low temperature oxidation reaction occurs.

Since no low temperature oxidation reaction occurs, second fuel injection is performed at timing T22 during the compression stroke. Even if spark ignition is performed at timing T23 thereafter, a history of the heat generation amount is completely different from that of the present embodiment. Even if the timing T22 is immediately before the timing T23, self-ignition and flame propagation do not occur in parallel unlike in the present embodiment since heat is not generated by the low temperature oxidation reaction.

Figure 12:
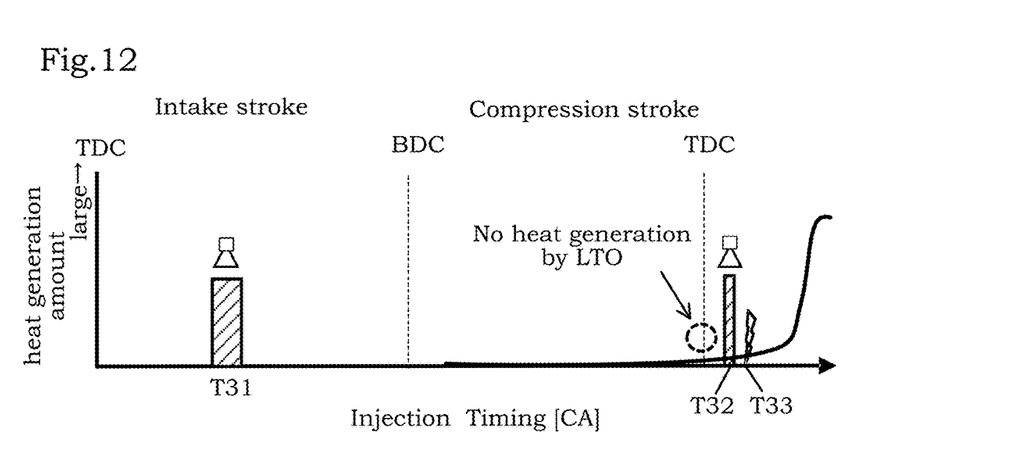
FIG. 12 is a timing chart in the case of a catalyst warm-up operation.

FIG. 12 is a timing chart showing a fuel injection timing, an ignition timing and a heat generation amount in the combustion chamber when the ignition timing is retarded to a timing after a compression top dead center and a small amount of fuel is injected to the vicinity of the ignition plug immediately before ignition as in FIG. 3. Such a control is executed to promote a temperature increase of an exhaust gas catalyst such as at a cold start.

At timing T31 during an intake stroke, fuel injection is performed to form a homogeneous air-fuel mixture in the combustion chamber. As in the case of FIG. 11, the amount of air supplied to the combustion chamber 22 is about 14.7 when a fuel injection amount is 1, wherefore no low temperature oxidation reaction occurs.

Accordingly, even if a timing T32 at which second fuel injection is performed is immediately before an ignition timing T33, self-ignition and flame propagation do not occur in parallel unlike in the present embodiment.

Further, since the control shown in FIG. 12 is executed only during idling after a cold start, supercharging is not performed during this control. That is, even if it is intended to make an air-fuel ratio of the air-fuel mixture formed by the first fuel injection leaner than the stoichiometric air-fuel ratio, a large amount of air as in the present embodiment cannot be supplied. Thus, heat is not generated by the low temperature oxidation reaction in the control shown in FIG. 12.

Figure 13:
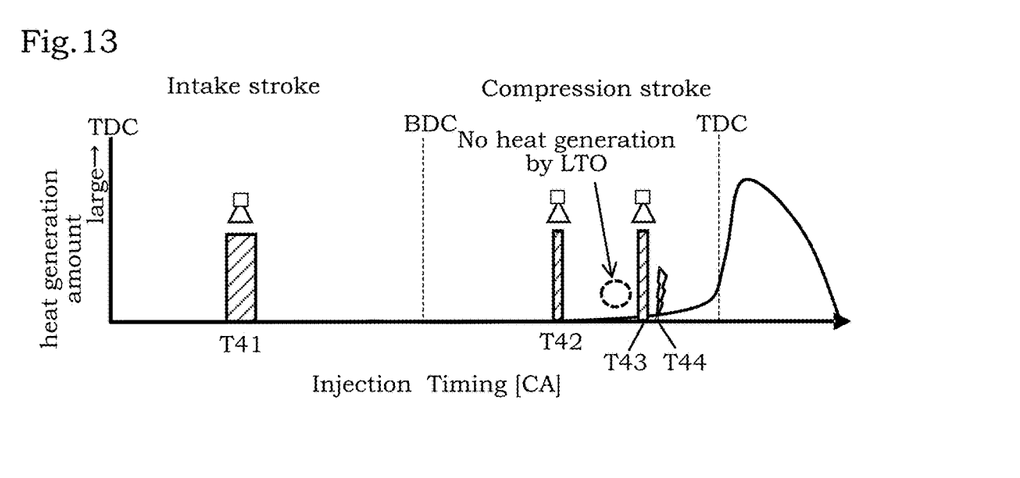
FIG. 13 is a timing chart in the case of a stratified lean operation.

FIG. 13 is a timing chart showing a fuel injection timing, an ignition timing and a heat generation amount in the combustion chamber in the case of performing so-called stratified lean combustion as in FIG. 3.

Stratified lean combustion is a form of combustion in which a homogeneous air-fuel mixture is formed by fuel injection during an intake stroke (timing T41), a stratified air-fuel mixture is formed around the ignition plug by fuel injection during a compression stroke (timings T42, T43) and combustion is performed at an air-fuel ratio leaner than the stoichiometric air-fuel ratio in the entire combustion chamber. Spark ignition by the ignition plug 20 is performed immediately after the third fuel injection timing T43 (timing T44). It should be noted that a load is controlled by a degree of stratification in the stratified lean combustion. Further, the stratified lean combustion is performed in a low load region and basically in a non-supercharged state.

Since the required load is generated at a weak lean air-fuel ratio (excess air ratio $\lambda$=about 1.2 to 1.3) in the stratified lean combustion, the amount of air supplied to the combustion chamber 22 is about 20 when the amount of the first fuel injection is 1. That is, the amount of air in the combustion chamber is less than in the present embodiment.

As described above, since the amount of air in the combustion chamber is small and supercharging is not performed in the stratified lean combustion, no low temperature oxidation reaction occurs. Thus, a homogeneous lean air-fuel mixture is formed in the combustion chamber, fuel is injected around the ignition plug near the compression top dead center and spark ignition is performed immediately thereafter in the stratified lean combustion shown in FIG. 13, but the stratified lean combustion is completely different from the form of combustion of the present embodiment in that the low temperature oxidation reaction is not utilized.

As described above, the form of combustion according to the present embodiment is different from the conventionally known one. According to the present embodiment, a stable operation is possible at an air-fuel ratio even leaner than that regarded as a lean limit in the conventionally known form of combustion.

Figure 14:
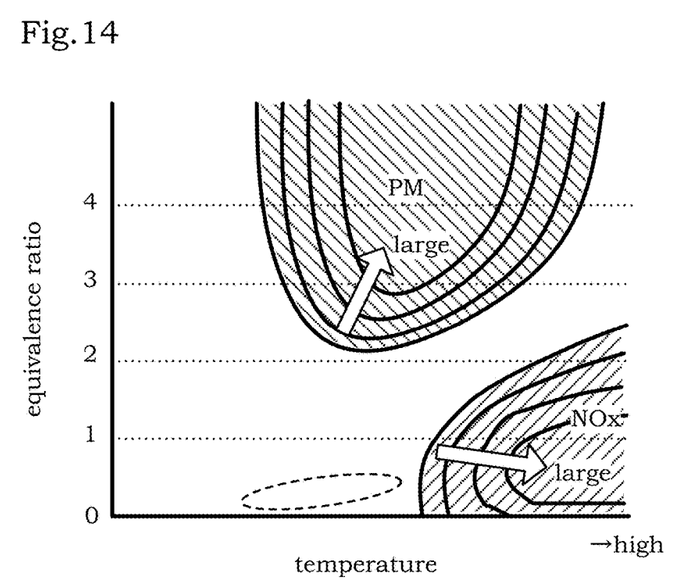
FIG. 14 is a graph showing an effect of reducing the NOx emission amount.

FIG. 14 is a graph describing that the deterioration of exhaust gas components is suppressed by the present embodiment. A vertical axis represents an equivalence ratio and a horizontal axis represents an in-cylinder gas temperature during combustion. Further, hatched regions in FIG. 14 respectively indicate a region where PM (Particulate Matter) is generated and a region where NOx is generated. A region encircled by a broken line in FIG. 14 indicates a region when the present embodiment is carried out.

As shown, PM is generated in a medium to high temperature region where the equivalence ratio is larger than 2, and NOx is generated in a high temperature region where the equivalence ratio is 0 to about 2.5. The conventionally known form of combustion described above falls within the NOx generation region of FIG. 14. This is because a combustion temperature is high as a matter of course if the equivalence ratio is 1 and the temperature increases due to the combustion of the air-fuel mixture even if the equivalence ratio is smaller than 1. In contrast, since a large amount of air is supplied into the combustion chamber by supercharging in the present embodiment as described above, a heat capacity of the gas in the combustion chamber increases and a temperature increase in the case of burning the air-fuel mixture is suppressed. As a result, the region when the present embodiment is carried out is the region encircled by the broken line in FIG. 14. That is, according to the present embodiment, it is possible not only to enable stable combustion at an equivalence ratio leaner than an equivalence ratio conventionally regarded as a lean limit, but also to suppress emission amounts of PM and NOx.

It should be noted that although only one fuel injection valve 21 for directly injecting fuel into the cylinder is provided in the above description, there is no limitation to this. For example, a port injection valve for injecting fuel into the intake passage 23 may be further provided and the first fuel injection may be performed by the port injection valve.

Further, if at least some of the spray beams pass through the vicinity of the discharge channel of the ignition plug 20, the fuel injection valve 21 may be arranged on a side wall of the combustion chamber 22.

Further, the aforementioned supercharged lean operation may be basically performed and the present embodiment may be carried out, for example, during a transient operation such as a switch between the supercharged lean operation and a homogeneous stoichiometric operation.

Further, although the turbo supercharger 4 is provided as a supercharger in the above description, there is no limitation to this. For example, a mechanical supercharger or an electric supercharger may be used. Since an electric supercharger can obtain a desired supercharging pressure in a wider operation region than the turbo supercharger 4, the present embodiment can be carried out in the wider operation region.

Further, ozone or the like may be supplied to further promote the low temperature oxidation reaction. However, in this case, a device for supplying ozone or the like is necessary besides the fuel injection valve 21.

As described above, in the present embodiment, the homogeneous air-fuel mixture leaner than that at the stoichiometric air-fuel ratio is formed in the cylinder by the first fuel injection and the second fuel injection is performed to inject a smaller amount of fuel than in the first fuel injection toward the vicinity of the discharge channel of the ignition plug 21 during a period in which the homogeneous air-fuel mixture is undergoing the low temperature oxidation reaction in the compression stroke. After the second fuel injection, spark ignition is performed at such a timing that a spark of the ignition plug 21 reaches the fuel injected by the second fuel injection. In this way, stable combustion is possible even at an air-fuel ratio leaner than the air-fuel ratio conventionally regarded as the lean limit. Further, the deterioration of the exhaust gas components can be suppressed. It should be noted that the injection amount of the second fuel injection is smaller than that of the first fuel injection for the following reason. Since it is sufficient to ensure a fuel amount capable of starting combustion by spark ignition by the spark of the ignition plug reaching the injected fuel in the second fuel injection, the injection amount of the second fuel injection is relatively smaller than that of the first fuel injection. Thus, it is not an essential requirement that the injection amount of the second fuel injection is smaller than that of the first fuel injection.

Further, in the present embodiment, the condition for the occurrence of the low temperature oxidation reaction is satisfied by supplying a large amount of air using the supercharger.

Further, in the present embodiment, the condition for the occurrence of the low temperature oxidation reaction is satisfied by controlling the variable compression ratio mechanism toward the high compression ratio side.

Although the embodiment of the present invention has been described above, the above embodiment is merely an illustration of one application example of the present invention and not intended to limit the technical scope of the present invention to the specific configuration of the above embodiment.

The invention claimed is:

1. A control method for internal combustion engine, comprising:

forming an air-fuel mixture with air-fuel ratio more than 30 in a cylinder by first fuel injection;

causing a low temperature oxidation reaction by compressing the mixture;

performing second fuel injection to inject an amount of fuel to make an air-fuel ratio of the air-fuel mixture in the entire cylinder including the air-fuel mixture formed by the first fuel injection leaner than the stoichiometric air-fuel ratio toward the vicinity of a discharge gap of an ignition plug, that is close enough to cause a fuel spray to ignite when the ignition plug is sparked during a period in which the air-fuel mixture is undergoing the low temperature oxidation reaction; and performing spark ignition by the ignition plug at a timing at which a spark of the ignition plug reaches the fuel injected by the second fuel injection after the second fuel injection.

2. The control method for internal combustion engine according to claim 1, wherein:

the internal combustion engine includes a supercharger; and supercharging by the supercharger is performed so that the low temperature oxidation reaction occurs.

3. The control method for internal combustion engine according to claim 1, wherein:

the internal combustion engine includes a variable compression ratio mechanism; and a compression ratio is increased by the variable compression ratio mechanism so that the low temperature oxidation reaction occurs.

4. A control device for internal combustion engine, comprising:

a fuel injection valve for supplying fuel into a cylinder;

an ignition plug for performing spark ignition to an air-fuel mixture in the cylinder; and a controller for controlling a fuel injection timing and an ignition timing;

wherein the controller performs:

first fuel injection to form an air-fuel mixture with air-fuel ratio more than 30 in the cylinder;

compression of the mixture to cause a low temperature oxidation reaction;

second fuel injection to inject an amount of fuel to make an air-fuel ratio of the air-fuel mixture in the entire cylinder including the air-fuel mixture formed by the first fuel injection leaner than the stoichiometric air-fuel ratio toward the vicinity of a discharge gap of the ignition plug, that is close enough to cause a fuel spray to ignite when the ignition plug is sparked during a period in which the air-fuel mixture is undergoing the low temperature oxidation reaction; and spark ignition by the ignition plug at a timing at which a spark of the ignition plug reaches the fuel injected by the second fuel injection after the second fuel injection.

* * * * *